US012528216B2

(12) United States Patent
Wachtel

(10) Patent No.: US 12,528,216 B2
(45) Date of Patent: Jan. 20, 2026

(54) THROATLESS POWER ROTARY SHEARS

(71) Applicant: Tonyazzopardi Holdings, LLC, Saint Clair, MI (US)

(72) Inventor: Anthony Wachtel, Saint Clair, MI (US)

(73) Assignee: Tonyazzopardi Holdings, LLC, St. Clair, MI (US)

( * ) Notice: Subject to any disclaimer, the term of this patent is extended or adjusted under 35 U.S.C. 154(b) by 264 days.

(21) Appl. No.: 18/016,227

(22) PCT Filed: Jul. 15, 2021

(86) PCT No.: PCT/US2021/041878
§ 371 (c)(1),
(2) Date: Jan. 13, 2023

(87) PCT Pub. No.: WO2022/016008
PCT Pub. Date: Jan. 20, 2022

(65) Prior Publication Data

US 2023/0256637 A1 Aug. 17, 2023

Related U.S. Application Data

(60) Provisional application No. 63/052,241, filed on Jul. 15, 2020.

(51) Int. Cl.
*B26B 25/00* (2006.01)
*B23D 19/04* (2006.01)

(52) U.S. Cl.
CPC .............. *B26B 25/00* (2013.01); *B23D 19/04* (2013.01)

(58) Field of Classification Search
CPC ....... B26B 15/00; B26B 25/00; B26B 25/002; B26B 25/007; B23D 19/04; B23D 19/06;
(Continued)

(56) References Cited

U.S. PATENT DOCUMENTS 215,538 A * 5/1879 Perkins ................... B26B 25/00 30/265
255,102 A * 3/1882 Danheim ................ B26B 25/00 30/265
(Continued)

FOREIGN PATENT DOCUMENTS

CH 507070 A * 5/1971 ............. B26B 25/00
CN 101505899 A 8/2009
(Continued)

OTHER PUBLICATIONS

Wikipedia, "Shear (sheet metal)", retrieved from the Internet: <https://en.wikipedia.org/wiki/Shear_(sheet_metal)>, retrieved Feb. 16, 2025 (5 pages).
(Continued)

*Primary Examiner* — Jason Daniel Prone
(74) *Attorney, Agent, or Firm* — Christopher G. Darrow; Darrow Mustafa PC

(57) ABSTRACT

A throatless rotary shear device includes an s-shaped frame, a feed wheel, and a cut wheel. The cut wheel can be adjacent to and offset from the feed wheel such that an overlap is defined therebetween. A v-shaped relief can be provided on the s-shaped frame. The v-shaped relief can be aligned with the overlap. Portions of material cut by the rotary shear device are urged in different directions by the v-shaped relief.

16 Claims, 9 Drawing Sheets

(58) Field of Classification Search
CPC ....... B23D 19/065; B43M 7/00; B43M 7/001; B43M 7/002; B43M 7/005
USPC ........................................... 30/228, 263–265
See application file for complete search history.

(56) References Cited

U.S. PATENT DOCUMENTS

| | | | | | | |
|---|---|---|---|---|---|---|
| 324,404 | A | * | 8/1885 | Monday | B26B 25/00 | 30/265 |
| 417,167 | A | * | 12/1889 | Gibson | B26B 25/00 | 30/265 |
| 445,700 | A | * | 2/1891 | Lachaume et al. | B26B 25/00 | 30/265 |
| 541,463 | A | * | 6/1895 | Thompson | B26B 25/00 | 30/265 |
| 603,851 | A | * | 5/1898 | Jackson et al. | B26B 25/00 | 30/265 |
| 656,615 | A | * | 8/1900 | Caldwell | B26B 25/00 | 30/264 |
| 742,946 | A | * | 11/1903 | Wineman et al. | B26B 25/00 | 30/265 |
| 769,081 | A | * | 8/1904 | Hemington | B26B 25/00 | 30/265 |
| 771,281 | A | * | 10/1904 | Smith | B27G 19/02 | 30/265 |
| 796,708 | A | * | 8/1905 | Conkling | B26B 25/00 | 30/265 |
| 896,385 | A | * | 8/1908 | Hughes | B26B 25/00 | 30/265 |
| 982,743 | A | * | 1/1911 | Potstada | B26B 25/00 | 30/265 |
| 1,098,671 | A | * | 6/1914 | Lundy | B26D 7/32 | 30/265 |
| 1,229,120 | A | * | 6/1917 | Montgomery | B26B 25/00 | 30/265 |
| 1,395,150 | A | * | 10/1921 | Scalfaro et al. | B26B 25/00 | 30/264 |
| 1,410,972 | A | | 3/1922 | Wagner | | |
| 1,422,901 | A | * | 7/1922 | Terry | C14B 5/00 | 30/265 |
| 1,508,869 | A | * | 9/1924 | Astrup | B26B 25/00 | 30/265 |
| 1,511,892 | A | * | 10/1924 | Lusby | B26B 25/005 | 30/265 |
| 1,589,465 | A | * | 6/1926 | Gury | B26B 25/00 | 30/264 |
| 1,607,010 | A | * | 11/1926 | Madsen | B43M 7/002 | 30/265 |
| 1,609,619 | A | * | 12/1926 | Galvin | B44C 7/022 | 30/265 |
| 1,649,957 | A | * | 11/1927 | Holtzman | B26B 25/00 | 30/263 |
| 1,720,305 | A | * | 7/1929 | Tjernlund | B23D 19/08 | 30/265 |
| 1,842,943 | A | | 1/1932 | Nebel et al. | | |
| 1,884,377 | A | * | 10/1932 | Temple | B26B 25/005 | 30/265 |
| 1,952,785 | A | * | 3/1934 | Bedell | B26B 25/005 | 30/265 |
| 2,042,097 | A | * | 5/1936 | Havanas | B23D 29/005 | 30/265 |
| 2,174,222 | A | * | 9/1939 | Florian | B26B 25/005 | 30/263 |
| 2,276,365 | A | * | 3/1942 | Angel | B26B 25/005 | 30/265 |
| 2,285,249 | A | * | 6/1942 | Barentzen | D06H 7/24 | 30/265 |
| 2,522,006 | A | * | 9/1950 | Wilcox | A61F 15/02 | 30/263 |
| 2,527,082 | A | * | 10/1950 | Salas | D06H 7/24 | 30/263 |
| 2,570,195 | A | * | 10/1951 | Bird et al. | B26B 25/00 | 30/264 |
| 2,578,346 | A | * | 12/1951 | Florian et al. | D06H 7/24 | 30/265 |
| 2,642,658 | A | * | 6/1953 | Johnson | B23D 29/005 | 30/264 |
| 2,647,313 | A | * | 8/1953 | Ohlsson | B43M 7/005 | 30/265 |
| 2,656,889 | A | * | 10/1953 | Kaplan | B43M 7/005 | 30/DIG. 3 |
| 2,728,985 | A | * | 1/1956 | Quackenbush | B23D 29/005 | 30/265 |
| 2,861,340 | A | * | 11/1958 | Hazzard | B26B 25/00 | 30/264 |
| 3,380,158 | A | * | 4/1968 | Du Bois | B26B 5/005 | 30/265 |
| 3,562,907 | A | * | 2/1971 | Greenberg | B26B 25/00 | 30/233 |
| 3,597,843 | A | * | 8/1971 | Kettlestrings | B43M 7/002 | 30/265 |
| 3,602,990 | A | * | 9/1971 | Stumpf | B26B 25/00 | 30/264 |
| 3,605,842 | A | * | 9/1971 | Kuri | B26B 25/00 | 30/276 |
| 3,621,572 | A | * | 11/1971 | Kruger | B26B 25/00 | 30/178 |
| 3,668,780 | A | * | 6/1972 | Cowdrey | B26B 25/00 | 30/264 |
| 3,670,412 | A | * | 6/1972 | Cunningham | B26B 25/00 | 30/295 |
| 3,783,513 | A | * | 1/1974 | Escoe | B26B 25/00 | 30/276 |
| 3,906,629 | A | * | 9/1975 | Fuchs, Jr. | B26B 25/00 | 30/265 |
| 4,081,906 | A | * | 4/1978 | Sigler | B26B 25/00 | 30/276 |
| 4,275,500 | A | * | 6/1981 | Speer, Jr | B26B 25/00 | 30/240 |
| 4,283,853 | A | * | 8/1981 | Fazzini | B23D 19/04 | 30/265 |
| 4,574,480 | A | * | 3/1986 | Dunn | B23D 19/04 | 30/265 |
| 4,646,438 | A | * | 3/1987 | Hessler | B26B 25/00 | 30/265 |
| 4,662,069 | A | * | 5/1987 | Pate | B26B 25/00 | 30/273 |
| 4,693,004 | A | * | 9/1987 | Plana | B26B 25/005 | 30/265 |
| 5,463,942 | A | * | 11/1995 | Hupf | B26B 25/00 | 30/276 |
| 5,881,624 | A | * | 3/1999 | Brugue | B26D 1/185 | 30/265 |
| 6,212,772 | B1 | | 4/2001 | Whitmyre et al. | | |
| 7,089,669 | B2 | * | 8/2006 | Fritz | B26B 25/005 | 30/265 |
| 7,975,582 | B1 | * | 7/2011 | Coon | B23D 19/04 | 30/265 |
| 8,261,453 | B2 | * | 9/2012 | Huang | B26B 15/00 | 30/228 |
| 8,443,518 | B2 | * | 5/2013 | Fisher | B26B 15/00 | 30/263 |
| 9,168,188 | B2 | * | 10/2015 | Zwirkoski | B26B 25/00 | |
| 11,104,023 | B2 | * | 8/2021 | Kamiya | B26B 25/00 | |
| 2003/0150305 | A1 | * | 8/2003 | Fisher | B23D 19/04 | 83/13 |
| 2003/0233756 | A1 | * | 12/2003 | Muhlebach | B26B 29/06 | 30/265 |
| 2004/0016129 | A1 | * | 1/2004 | Lammers | B26B 25/00 | 30/263 |
| 2009/0106985 | A1 | * | 4/2009 | Durham | B26B 5/00 | 30/280 |

FOREIGN PATENT DOCUMENTS

| | | | |
|---|---|---|---|
| CN | 110744122 | A | 2/2020 |
| CN | 210731173 | U | 6/2020 |

(56) References Cited

FOREIGN PATENT DOCUMENTS

| | | | | | |
|---|---|---|---|---|---|
| DE | 2301774 | A1 | | 7/1974 | |
| FR | 2459709 | A1 | * | 1/1981 | ............. B26B 25/00 |
| GB | 270732 | A | * | 9/1927 | ............. B23D 19/04 |

OTHER PUBLICATIONS

Matras, "Lorica Segmentata Construction, Advise and tips for first-timers", 2008 (19 pages).

Roney, "Sheet Metal Worker, A Suggested Training Course", 1965 (23 pages).

Bahaley et al., "Design and Optimization of a Shearing Machine Using FEA", Proceedings of the International Conference on Science & Engineering for Sustainable Development, 2017, pp. 181-192 (12 pages).

EBAY, "Black & Decker Tools Rotary Power Cutter 7975, Variable Speed Reversing", retrieved from the Internet: <https://www.ebay.com/itm/405693697559?_trkparms=amclksrc%3DITM%26aid%3D1110006%26algo%3DHOMESPLICE.SIM%26ao%3D1%26asc%3D282703%2C282425%26meid%3D38dd1315b5f7423cb26f2a2830f963f4%26pid%3D101506%26rk%3D2%26rkt%3D10%26sd%3D387939849491%26itm%3D405693697559%26pmt%3D0%26noa%3D1%26pg%3D4481478%26algv%.

International Search Authority, International Search Report and Written Opinion for International Application No. PCT/US2021/041878 dated Oct. 22, 2021 (8 pages).

* cited by examiner

THROATLESS POWER ROTARY SHEARS

CROSS-REFERENCE TO RELATED APPLICATIONS

This application is a national stage application under 35 U.S.C. 371 of International Patent Application No. PCT/US2021/041878 filed on Jul. 15, 2021, which claims the benefit under 35 U.S.C. 119(e) of U.S. Provisional Application Ser. No. 63/052,241, filed on Jul. 15, 2020, which are incorporated by reference herein in their entireties.

BACKGROUND

1. Field

The subject matter described herein relates to a throatless power rotary shear, methods of manufacturing same, and methods of using same. More particularly, the subject matter described herein relates to a motorized power rotary shear useful for cutting sheet metal and other sheeted materials.

2. Description of the Prior Art

Conventional metal shears are well known in the art, including one of the most common types of hand operated shear. Use of such a shear poses problems for operators because sharp edges can cut their hand, and getting a smooth cut is truly problematic.

However, practitioners of those shears have become aware of certain problems which are presented by those shears. One particular problem that has plagued users has been that it is difficult to separate the pieces generated by the shears once the cut has been made. Further, it has been very difficult to back the blade out of the cut, and it has been very difficult to make accurate angled cuts. There are complexities which give rise to injuries and physical disabilities.

It would be of a great advantage to the construction industry if there was provided an easy to use power rotary shear mechanism, and method of making it, as well as a method of using it.

SUMMARY

In accordance with the above-noted advantages and desires of the industry, the subject matter presented herein provides an easy to use power rotary shear to facilitate cutting rigid and semi-rigid sheeted materials, such as rigid sheeted material including the likes of metal roofing, or other rolled or formed sheet metal, sheeted rigid plastics, fiberglass, and the like, as well as a method of making same, and a method of using it. This includes utilizing a portable single handed, weight balanced, smooth cutting power rotary shear. This overcomes many of the aforementioned problems with the prior art because cutting rigid sheeted materials is no longer a dangerous activity.

The power rotary shear described herein has certain features including a v-shaped relief behind the rotary cutting blades that automatically separates the pieces generated by the cutting operation. Cutting rigid sheeted materials, especially large pieces, is made almost effortless with the inclusion of the motorized power rotary shear described herein that can be operated with one hand, while holding the workpiece with the other hand. By including a reversible motor, backing out after making a cut that does not need to cut all the way to the full length of the sheeted material is much easier.

The subject matter presented herein is particularly useful for applications in the contractor and construction industries that require the cutting and fitting of large pieces of metal roof, plastic sheeting for shower stalls, as well as any other large piece of rigid sheeted long construction material. The applications are too numerous to mention here.

Although the subject matter presented herein will be described by way of examples hereinbelow for specific aspects having certain features, it must also be realized that minor modifications that do not require undo experimentation on the part of the practitioner are covered within the scope and breadth of this application. Additional advantages and other novel features of the subject matter presented herein will be set forth in the description that follows and in particular will be apparent to those skilled in the art upon examination or which may be learned within the practice of the subject matter presented herein. Therefore, the subject matter presented herein is capable of many other different aspects and its details are capable of modifications of various aspects which will be obvious to those of ordinary skill in the art all without departing from the spirit of the subject matter presented herein. Accordingly, the rest of the description will be regarded as illustrative rather than restrictive.

BRIEF DESCRIPTION OF THE DRAWINGS

For a further understanding of the nature and advantages of the expected scope and various aspects of the subject matter presented herein, reference shall be made to the following detailed description, and when taken in conjunction with the accompanying drawings, in which like parts are given the same reference numerals, and wherein.

DETAILED DESCRIPTION

Figure 1:
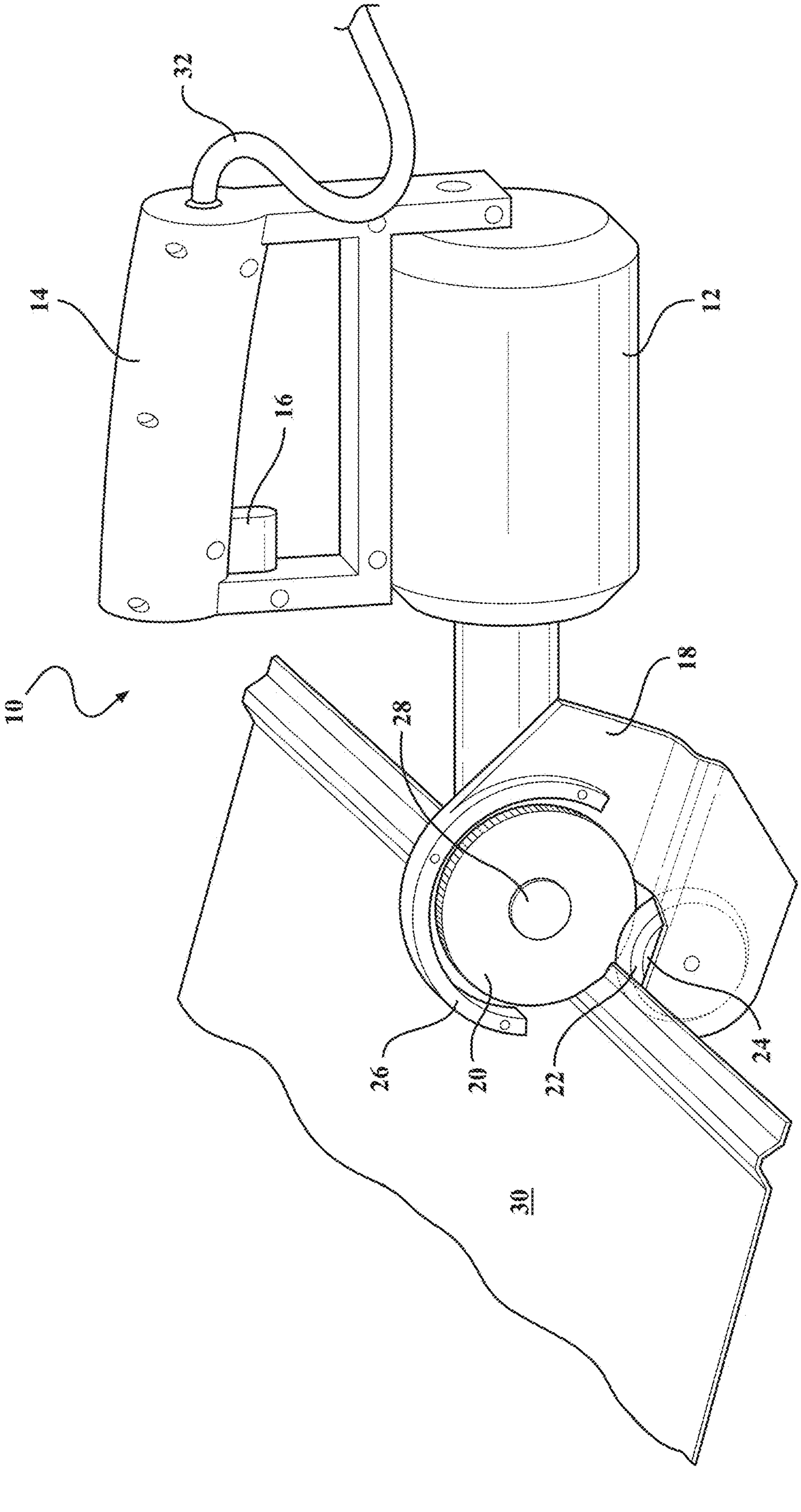
FIG. 1 is a side perspective view of a throatless power rotary shear, in use, cutting a sheeted material.

Referring now to the drawings in detail, FIG. 1 is a side perspective view of a throatless power rotary shear 10 used for cutting a sheeted material, the throatless power rotary shear 10 being made in accordance with the subject matter presented herein. The throatless power rotary shear 10 includes a motor 12, a handle 14 and a trigger 16 in a position that enables the throatless power rotary shear 10 to be operated in a one-handed fashion. The throatless power rotary shear 10 includes an s-shaped frame 18 that accommodates a feed wheel 20 and a cut wheel 22. A cut wheel shaft 24 secures the cut wheel 22 during operation, while a feed wheel transmission shaft 28 secures the feed wheel 20 during operation. A feed wheel guard 26 helps to prevent dangerous splintering of materials, in order to protect the operator. The sheeted rigid material 30 is easily cut by the throatless power rotary shear 10, and will be described more fully herein below.

Figure 2:
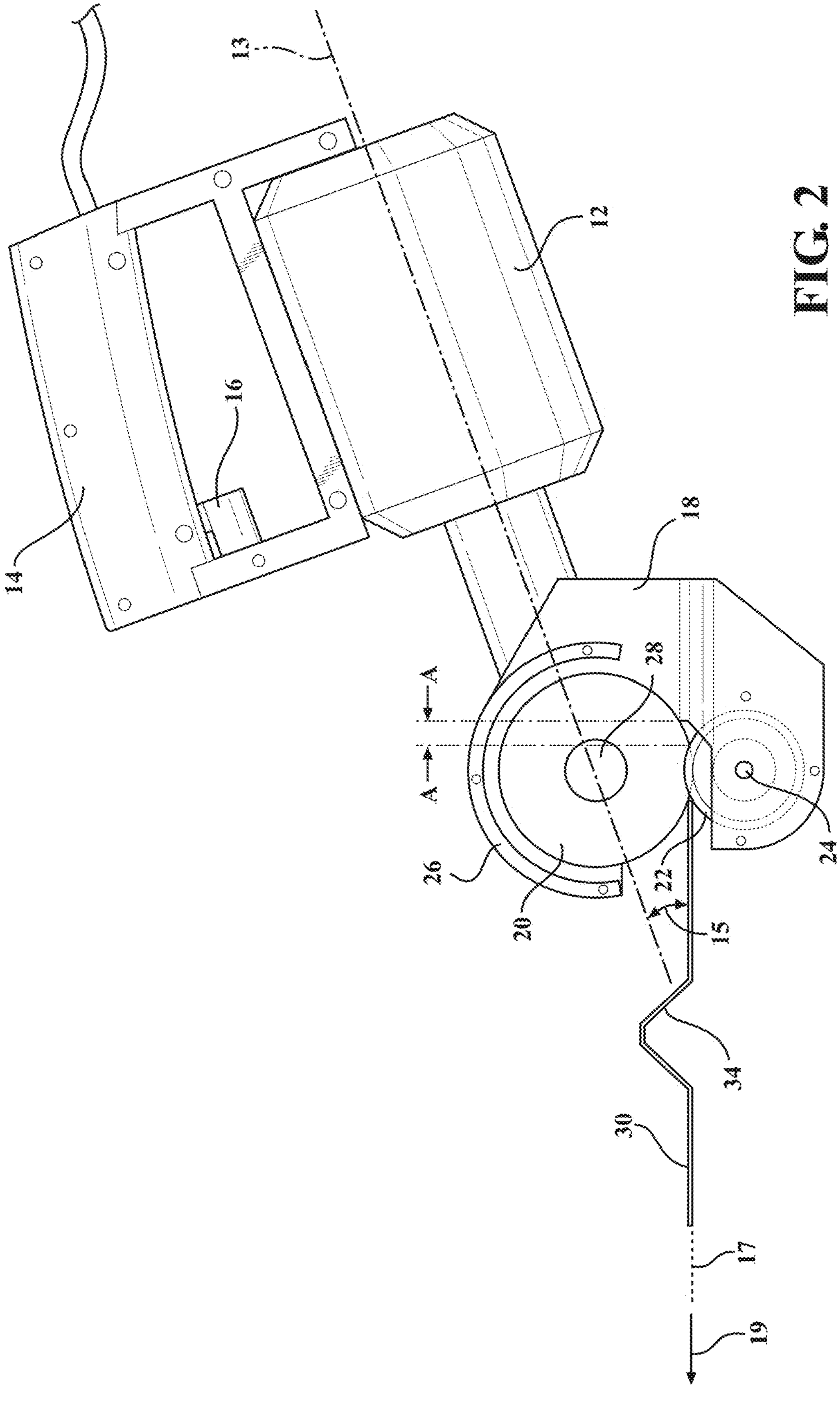
FIG. 2 illustrates a side elevational view of the throatless power rotary shear with details of a v-shaped relief behind a feed wheel and a cut wheel.
Figure 8:
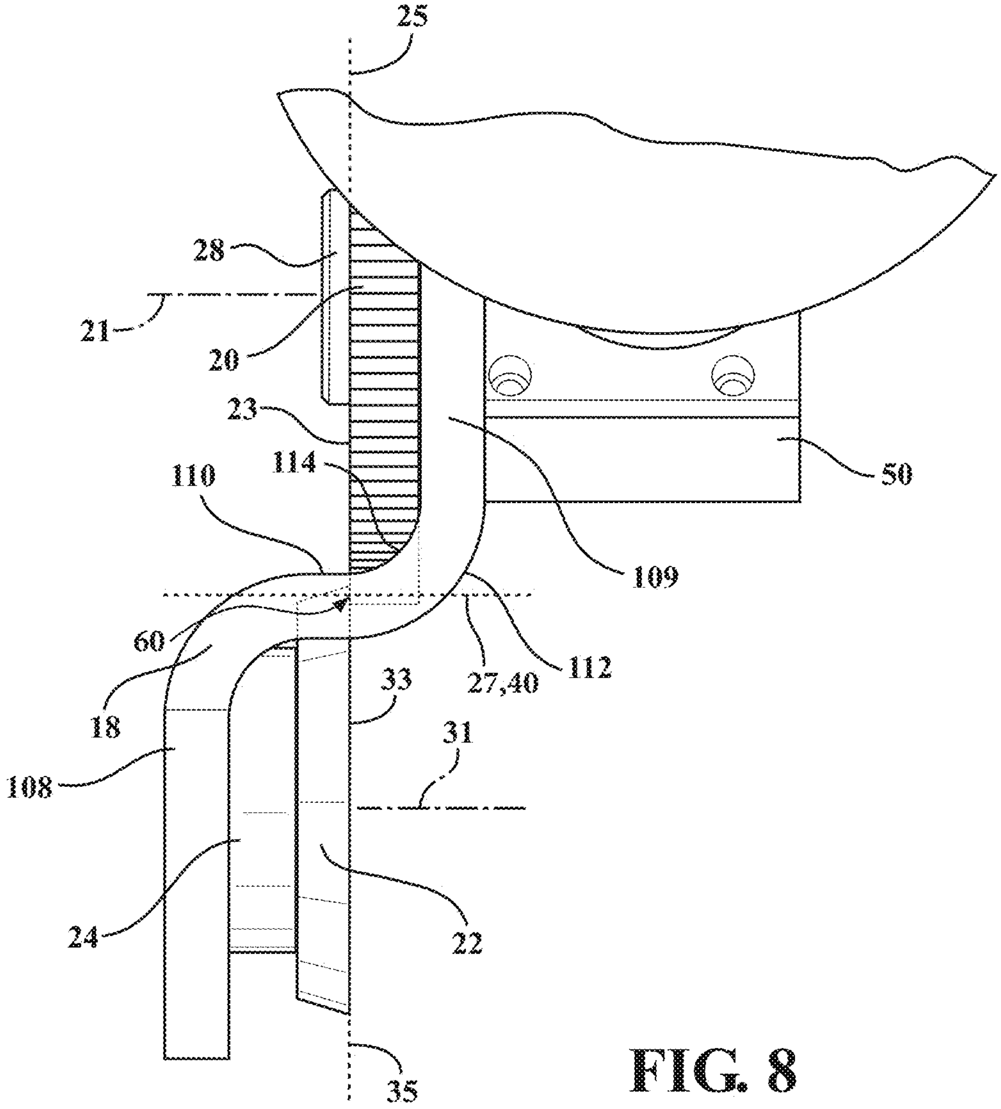
FIG. 8 is a rear elevational view of the relative placement of some components of the throatless power rotary shear.

Looking next to FIG. 2, a side elevational view of the throatless power rotary shear 10 illustrates how the sheeted rigid material 30, which is corrugated, is fed between the cut wheel 22 and the feed wheel 20. As before, the handle 14 is mounted onto or near the motor 12 with the trigger 16. The motor 12 may be activated in a cordless fashion, or a traditional electric cord connection (e.g., by an electric cord 32). The feed wheel 20 is driven in a rotary fashion by the feed wheel transmission shaft 28, while the cut wheel 22 is driven by the cut wheel shaft 24. Referring to FIG. 8, the feed wheel 20 can have a rotational axis 21. The feed wheel 20 can include an inner face 23. A plane 25 can be defined by the inner face 23 of the feed wheel 20. The cut wheel 22 can have a rotational axis 31. The cut wheel 22 can have an inner face 33. A plane 35 can be defined by the inner face 33 of the cut wheel 22. The cut wheel 22 can be adjacent to and offset from the feed wheel 20 such that an overlap 60 is defined therebetween. Referring back to FIG. 2, the feed wheel guard 26 and a lower portion of the s-shaped frame 18 help to prevent injuries from flying bits during the cutting operation. Distance A-A exists between the end of the contact point between the feed wheel 20 and the cut wheel 22 and the s-shaped frame 18. The gap defined by distance A-A may range from ⅛ inch to 1 inch, and from about three quarters of an inch for corrugated metal roofing materials. This gap helps to separate the material after it has been cut. For some materials, the gap A-A would need to be relatively small, where for other materials, gap A-A needs to be larger in order to provide smooth flow of cut material. Regarding the overlap 60 of the feed wheel 20 and the cut wheel 22, less overlap means that one can cut through bent materials much more easily. Although the overlap 60 can be as little as 1.0 mm, it can be as much as one inch (1"), and may be 0.032" for certain applications. When cutting corrugated materials, the throatless power rotary shear 10 would have a lesser overlap of the feed wheel 20 and the cut wheel 22 in order to accommodate a corrugated incline part 34 of the sheeted rigid material 30 more easily. A v-shaped relief 100 behind the feed wheel 20 and the cut wheel 22 will provide a better direct flow of cut material, resulting in a smoother cut. The v-shaped relief is defined by gap A-A as shown in FIG. 2, and is essentially adjacent to the feed wheel 20 and the cut wheel 22.

The v-shaped relief 100 can be formed in the s-shaped frame 18. In some arrangements, the v-shaped relief 100 can be aligned with the overlap 60 in a plane 40 perpendicular to the plane 35 defined by the inner face 31 of the cut wheel 22 and/or the plane 25 defined by the inner face 23 of the feed wheel 20, as shown in FIG. 8. In some arrangements, the v-shaped relief 100 can be aligned with the overlap 60 in a plane 17 substantially parallel to the cutting direction 19, as shown in FIGS. 2 and 8. In some arrangements, the v-shaped relief 100 can be aligned with the overlap 60 in a plane 27 substantially perpendicular to the first axis of rotation 21 and/or the second axis of rotation 31, as shown in FIG. 8.

Figure 3:
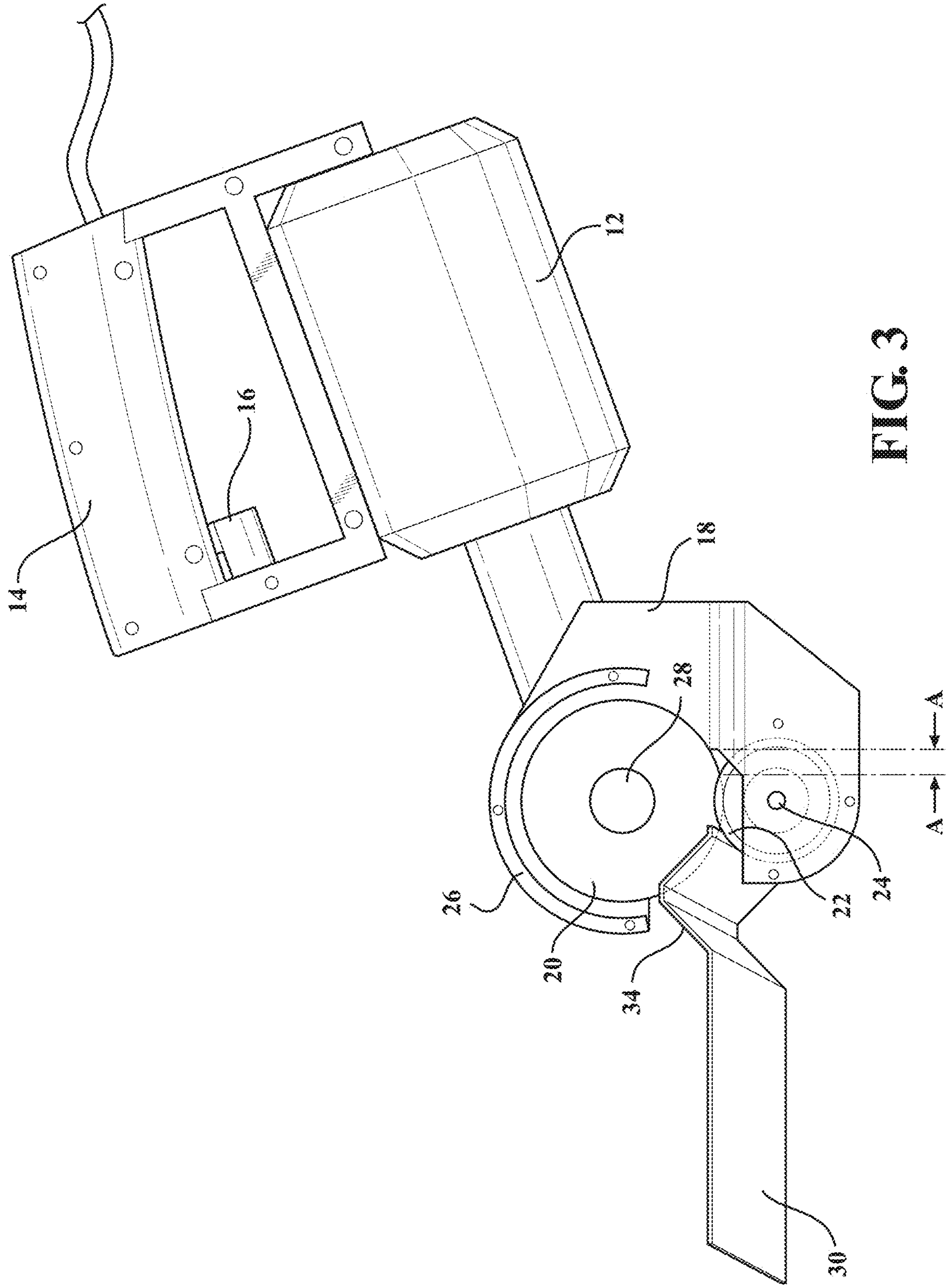
FIG. 3 is a side elevational view of the throatless power rotary shear being used to cut a piece of corrugated metal roofing panel.

FIG. 3 illustrates cutting the corrugated incline part 34 of the sheeted rigid material 30 (e.g., sheet metal) between the feed wheel 20 and the cut wheel 22. As can be seen in this figure, and due to a minimum overlap between the cut wheel 22 and the feed wheel 20, the corrugated incline part 34, as it is urged between the feed wheel 20 and the cut wheel 22, can follow the shape of the corrugated incline part 34, while gap A-A is defined by the v-shaped relief behind the feed wheel 20 and the cut wheel 22 (not shown in this figure). The v-shaped relief will be described more fully hereinbelow in FIG. 7A and FIG. 7B. Again as before with reference to FIG. 2 above, the handle 14 is mounted onto or near the motor 12 with the trigger 16. The motor 12 can be operatively connected to drive the feed wheel 20. The motor 12 can be located behind and spaced from the cut wheel 22 relative to a cutting direction 19. A rotational axis 13 of the motor 12 can be oriented at an angle 15 relative to the cutting direction 19. The motor 12 may be activated in a cordless fashion, or a traditional electric cord connection. The feed wheel 20 is driven in a rotary fashion by the feed wheel transmission shaft 28, while the cut wheel 22 is driven by the cut wheel shaft 24. The feed wheel guard 26 and the lower portion of the s-shaped frame 18 help to prevent injuries from flying bits during the cutting operation.

Figure 4:
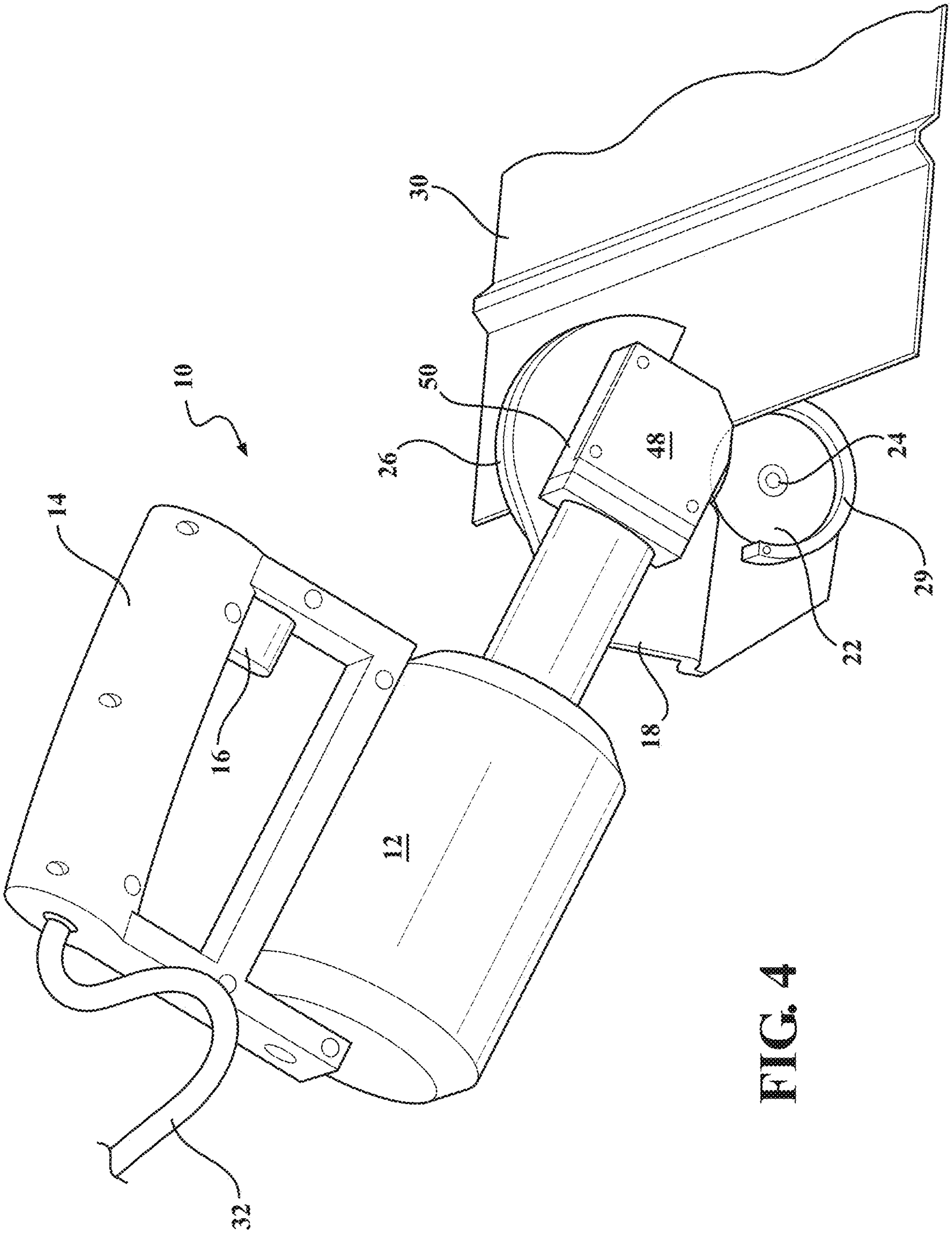
FIG. 4 is a rear perspective view of the throatless power rotary shear, in use, cutting a sheeted material in front of a corrugated portion.

Looking next to FIG. 4, another view of the throatless power rotary shear 10 is once again shown cutting the sheeted rigid material 30 (e.g., corrugated sheeted roofing material). The throatless power rotary shear 10 includes the motor 12 connected to the handle 14 and the trigger 16. A transmission cover 48 is secured by a transmission cover housing 50 in direct contact with the feed wheel guard 26. The sheeted rigid material 30 (e.g., a sheeted workpiece panel) is being fed between the cut wheel 22 and the feed wheel 20 which is not shown in this picture. The cut wheel shaft 24 rotates the cut wheel 22. A cut wheel guard 29 prevents dangerous flying pieces in order to protect the operator. When the trigger 16 is activated, power is delivered by electric cord 32 and the cutting operation begins. Cut material from the sheeted rigid material 30 (e.g., the sheeted workpiece panel) will be guided to separate the cut pieces by the s-shaped frame 18.

Figure 5:
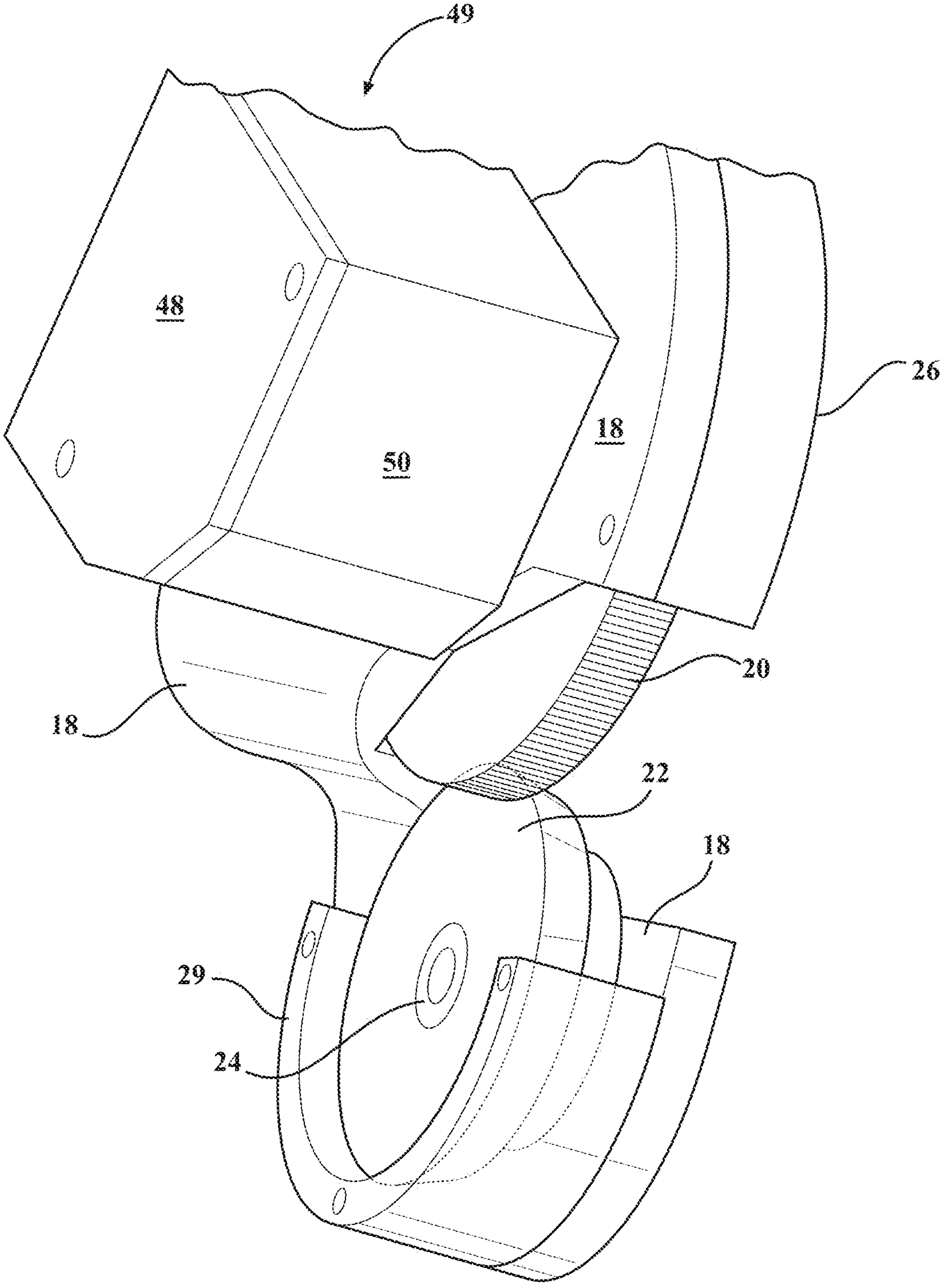
FIG. 5 is a close-up view of the meshing of the rotary cutting blades.

FIG. 5 is a front elevational perspective view of a close-up of the cutting wheel assembly, showing the relative placement of the cut wheel 22 and the feed wheel 20. The cut wheel 22 is being held in place by the cut wheel shaft 24, which is a free rolling shaft. The feed wheel 20 is being driven by a transmission 49 within transmission cover housing 50. The s-shaped frame 18 is shown as a securement for all other elements. The feed wheel guard 26 shields any bits from flying off and hurting the operator, while the cut wheel guard 29 performs the same function for the cut wheel 22.

Figure 6:
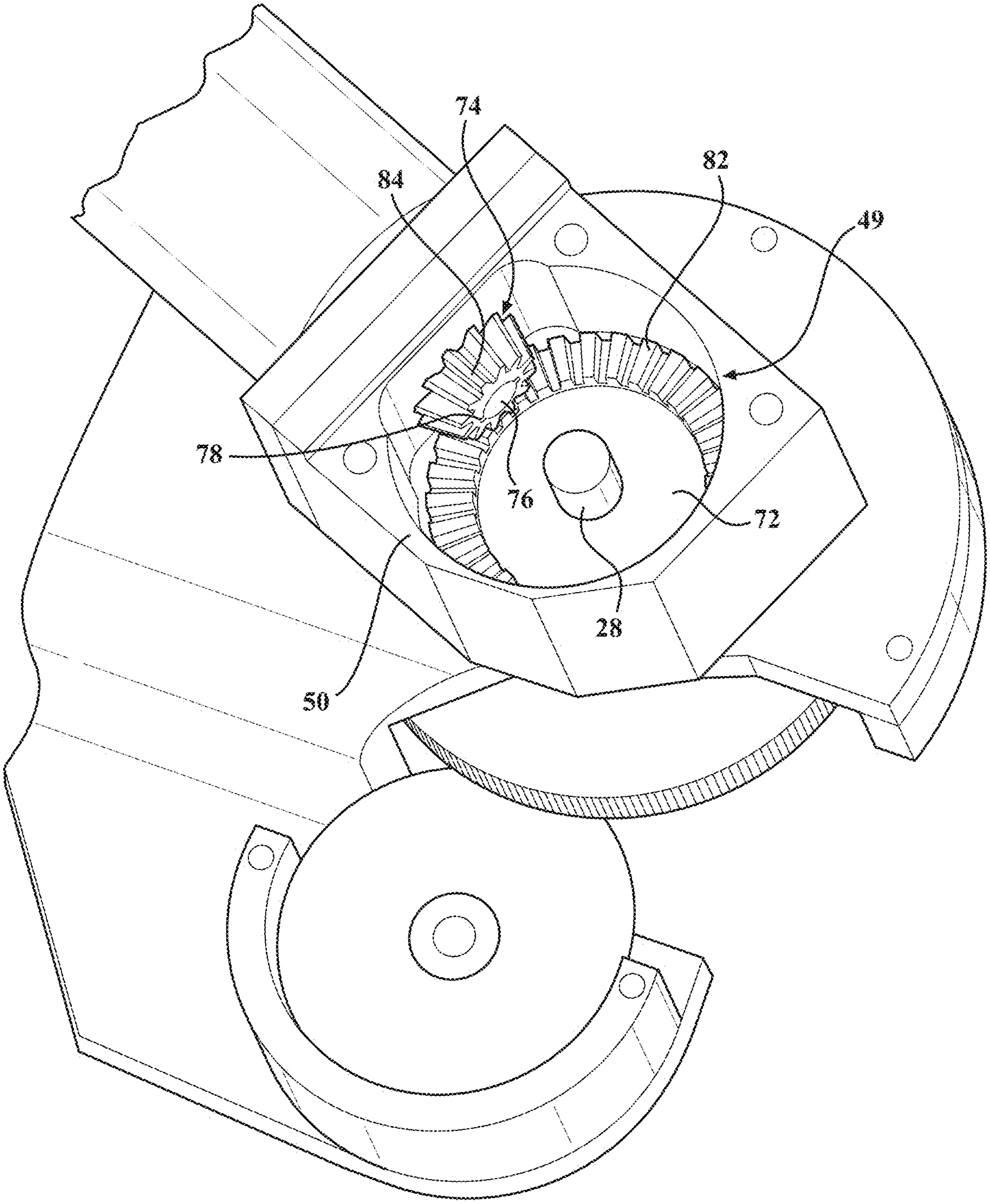
FIG. 6 shows an aspect of the beveled gear motor mechanism to create rotary action.

FIG. 6 shows a perspective detail of the transmission portion of the throatless power rotary shear 10, including the feed wheel transmission shaft 28 driving a beveled gear 72. A beveled drive gear 74 rotates about a bevel drive gear shaft 76 which is driven by drive gear teeth 78. The transmission cover housing 50 houses the entire beveled gear assembly. Gear teeth 82 communicate with drive gear teeth 84 to rotate the feed wheel transmission shaft 28. The transmission 49 generally indicates the entire transmission assembly including the gears.

Figure 7A:
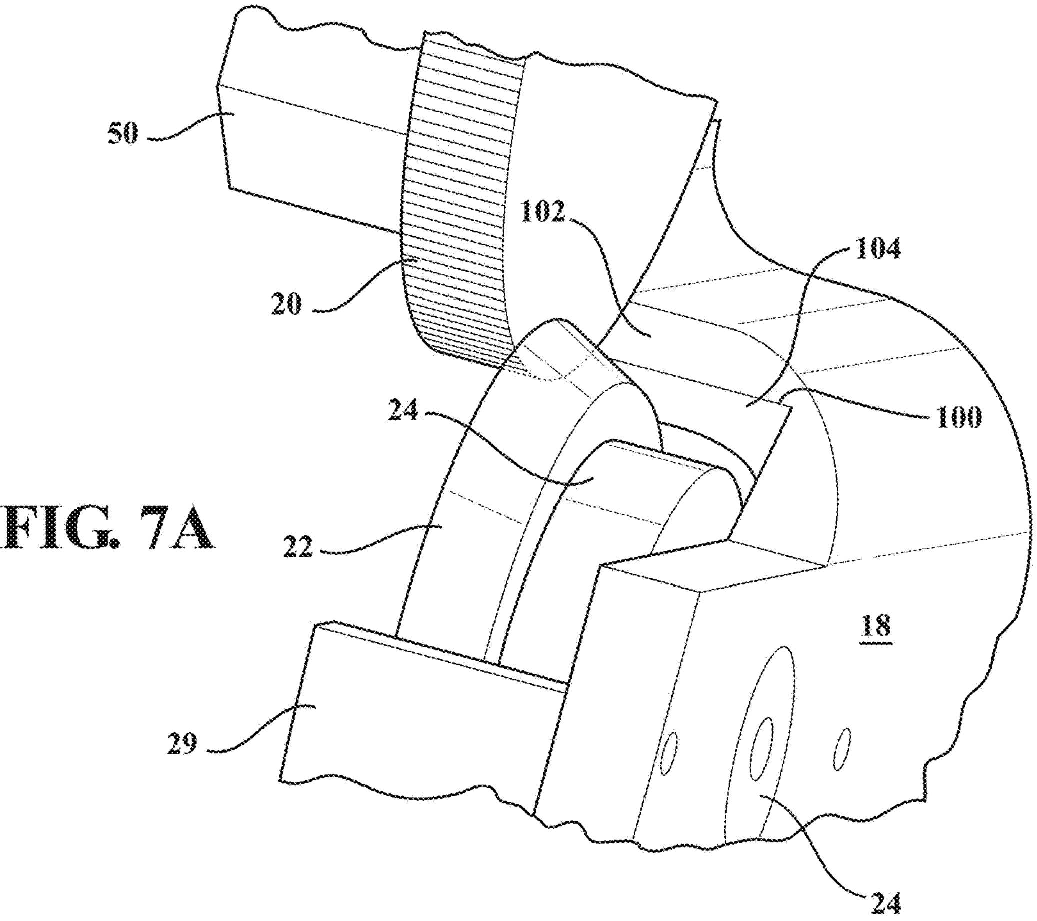
FIG. 7A is a close-up view of the relative placement of the rotary blades.

FIG. 7A is a close-up perspective view of the cut wheel 22 and its relative placement with regard to the feed wheel 20. The cut wheel shaft 24 secures the cut wheel 22 in position, biasing the cut wheel 22 with regard to the feed wheel 20. The cut wheel guard 29 is secured to the s-shaped frame 18. A v-shaped relief 100 is shown having a relatively vertical dimension, while an upper ramp 102 is essentially about 45° to the vertical, while a lower ramp 104 is 45° to the horizontal. Varying angles are anticipated herein, depending upon suitability for a particular cutting job. As material to be cut is fed between the cut wheel 22 and the feed wheel 20, the cut material is urged upwardly by the upper ramp 102, while the other cut piece is urged downwardly by the lower ramp 104. Thus, portions of material cut by the feed wheel 20 and the cut wheel 22 of the rotary shear device 10 are urged in different directions by the v-shaped relief 100. This v-shaped relief 100 behind the cut wheel 22 and the feed wheel 20 better directs the flow of cut material, resulting in a smooth cut. There is a slight gap behind the cut wheel 22 in order to allow for cut corrugated materials to separate. The transmission cover housing 50 encases the entire transmission assembly including the gears.

Figure 7B:
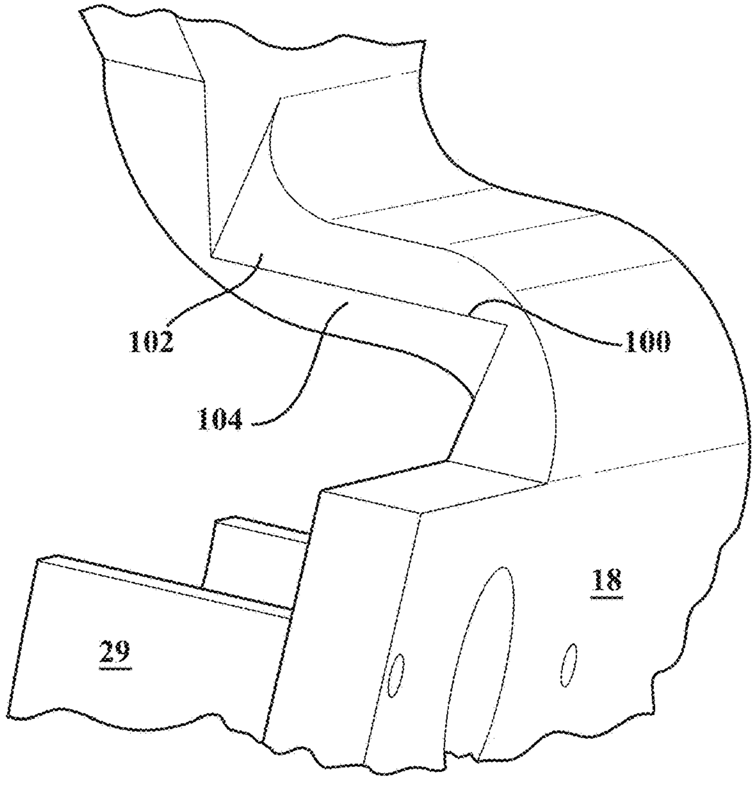
FIG. 7B is a close-up view of the relative placement of the v-shaped relief behind the rotary blades.

FIG. 7B is the same view as that shown in FIG. 7A, but without the cut wheel 22 and the feed wheel 20, in order to more clearly detail the v-shaped relief 100 behind the feed wheel 20 and the cut wheel 22. In order to appreciate one of the benefits of the throatless power rotary shear 10 described herein, the material exit geometry is more easily understood with the angle of exit via the upper ramp 102 and the material exit downwardly by the lower ramp 104. The upper ramp 102 and the lower ramp 104 respectively are formed into the s-shaped frame 18.

FIG. 8 is a rear elevational view of the s-shaped frame 18 having a vertical lower component 108, a vertical upper component 109, a horizontal portion 110, and an interior frame outside radius 112 opposite an inside radius 114. The cut wheel 22 is attached to the cut wheel shaft 24. The cut wheel 22 is urged against feed wheel 20, which is driven by the feed wheel transmission shaft 28 and it is in communication with the transmission inside the transmission cover housing 50. A ratio of a height of the vertical lower component 108 of the s-shaped frame 18 versus a width of the horizontal portion 110 of the s-shaped frame 18 is from 10 to 1 to 0.5 to 1, and from 4 to 1 to 1 to 1. These ranges of height-width ratios define suitable clearances for the cut wheel 22, the feed wheel 20, and the material being cut, although any other ratio may be more suitable for a particular application. The terms "vertical", "horizontal", "upper", and "lower" are used herein to indicate the relative location of these structures in the orientation of the s-shaped frame 18 in FIG. 8.

Figure 9:
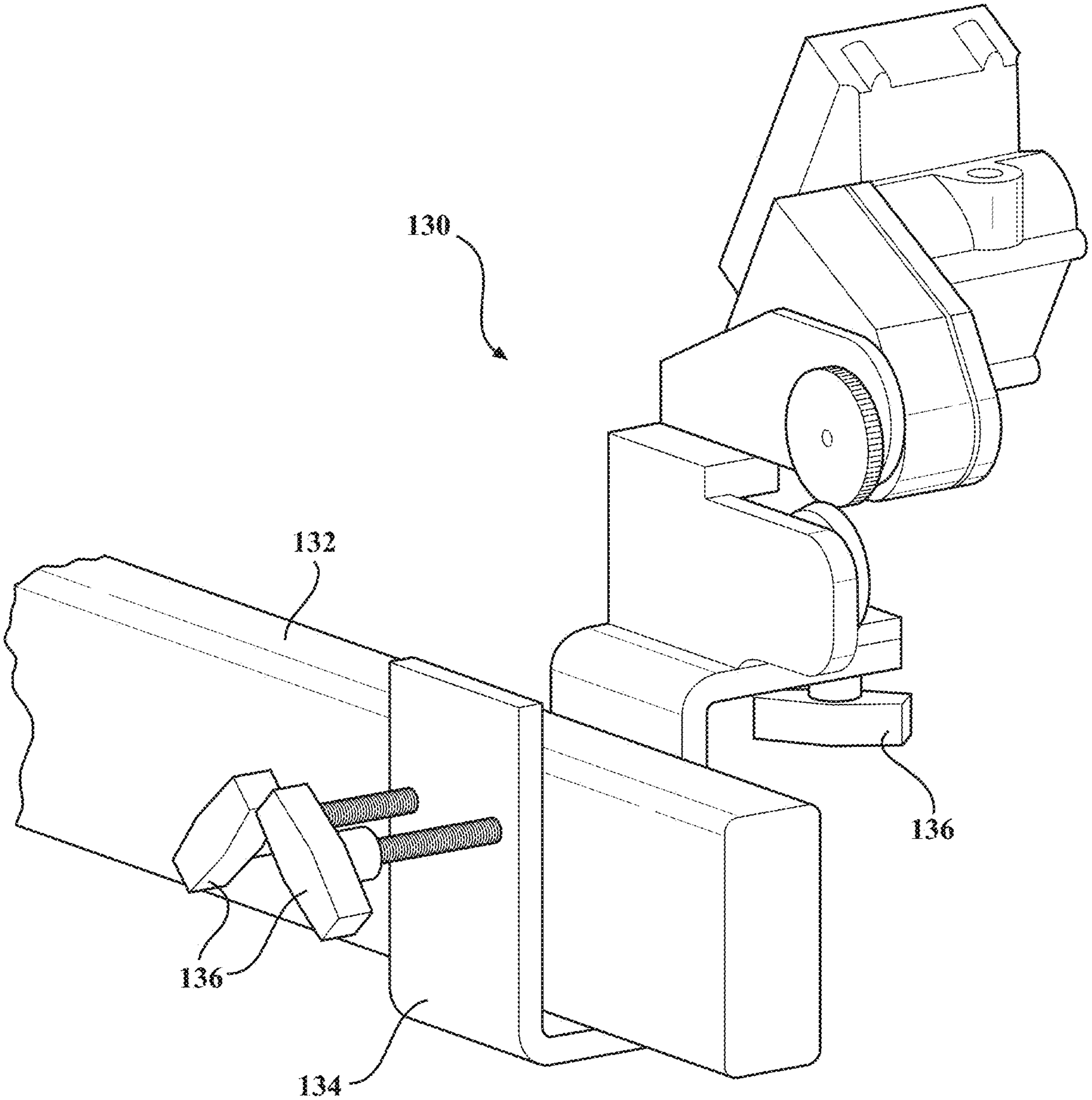
FIG. 9 shows another aspect of the throatless power rotary shear suitable for mounting, shown here as mounted on a sawhorse.

FIG. 9 illustrates a bench mount apparatus 130 for the throatless power rotary shear. The bench mount apparatus 130 may be attached to a wooden support 132, such as on a sawhorse. A mount attachment bracket 134 may include thumbscrews 136 or any other suitable mount attachment bracket fasteners. The throatless power rotary shear is secured onto mount attachment bracket 134 in a suitable configuration so that the material that is being cut may be fed through the cut and feed wheels. The throatless power rotary shear can be mounted on a bench, a wall, the tailgate of a pickup truck, or any place else that is convenient for the operator.

The present application includes a throatless power rotary shear including a portable motorized, weight balanced, power shears capable of being used single-handedly to provide smooth cuts between a cut wheel and a feed wheel. A v-shaped relief behind the cut wheel and the feed wheel separates any of the various cut materials to better direct the flow of the cut material, resulting in a smooth cut. An integral s-shaped frame has a clearance for better material flow and a developed width (e.g., the horizontal portion 110) between two vertical stanchions (e.g., the vertical lower component 108 and the vertical upper component 109) to optimize flow of cut materials. The s-shaped frame includes an upper and a lower ramp incorporated and integral within the s-shaped frame. The s-shaped frame 18 can include a first stanchion (e.g., the vertical lower component 108), a second stanchion (e.g., the vertical upper component 109), and a connecting portion (e.g., the horizontal portion 110) between the first stanchion and the second stanchion. The v-shaped relief 100 can be formed in the connecting portion. Referring to the view of FIG. 8, the first stanchion and the second stanchion can be parallel to each other. The first stanchion and the second stanchion can be spaced from each other by the connecting portion. The connecting portion can be perpendicular to the first stanchion and the second stanchion.

Due to the combination of the v-shaped relief and the integral s-shaped frame, the power shears are capable of being used as a balanced single handed hand tool. In this aspect, the v-shaped relief is formed into the s-shaped frame including an upper ramp and a lower ramp to separate the material after cutting. In addition, the combination configuration of the v-shaped relief along with the s-shaped frame enable an operator to make any type of cut, whether it be an angled cut or even perpendicular cuts for cutting around chimney flashing or the like. The power shears may include a gap of distance, A-A, between the exit point of the cut wheel and the feed wheel and the upper and lower ramps incorporated and integral within the s-shaped frame. The gap of distance, A-A, in the s-shaped frame of the power shears is from ⅛ inch to 1 inch, three quarters of an inch for sheet metal roofing having corrugated incline positions.

Prior art rotary cutting shears have been designed mostly for cutting cloth, which is extremely flexible and is easy to remove and separate the pieces being cut. However, when one is cutting a rigid construction material, such as metal roofing, fiberglass, plastic sheets or other hard and rigid materials, separating the pieces after they have been cut is much more difficult. Not only does it become tangled, but because the material is rigid, after it is cut, it provides a danger to the operator because his fingers may become cut on the sharp edges. This is not the case when cutting cloth. Therefore, these pieces of prior art do not necessarily apply to solve the problem to which the present application is addressed.

When an operator cuts a corrugated rigid material, the cutting surfaces ride up the incline of the corrugated area, and then ride down on the opposite side of the incline of the corrugation itself. During this operation, the corrugated component is urged downward in prior art devices, which causes a problem. By the downward urging of the rigid corrugated material after it has been cut, the cut portion becomes entangled in the machinery. The present application alleviates this issue by including a v-shaped relief in the frame of the tool immediately adjacent to the cutting wheels contact point. By using an s-shaped frame that includes the v-shaped relief, material is separated downward on one half and upward on the other, providing a clean separation. This clean separation also allows for easily backing the tool out of the cutting area by using a reverse gear that is motorized.

Prior art devices feed material that is to be cut between two sheer wheels where it is severed and then passed below the motor housing. The cutting edges of the two rotary shears are biased together at their point of contact to provide a positive shearing action. A cover is provided to protect the bearings of the driving shear wheel also act to direct cut material so that it does not "hang up" on the leading edge of the bracket. An additional bearing shield disposed over the bearing of the driving shear wheel is provided with a depending portion which serves to direct the remaining portion to cut material by the leading edge of the bracket. For very flexible materials, this is appropriate and acceptable, however, when cutting more rigid material, especially corrugated rigid material, the cut material becomes hung up, and is not easily separated, nor is it easy to back the tool out of the cutting operation.

When an operator is having to make angled cuts, such as a right angle in order to fit around a square chimney or the like, the operator goes forward and cuts the material, the v-shaped relief frame separates the material on one side downwardly and opposite side upwardly and provides a reverse gear so that the tool can easily be backed out to prevent further cutting. Then, cutting can come in from the 90° angle and easily make a 90° angle cut, to shape the rigid material, as desired, depending upon the particular issue during construction. As in the prior art devices, however, all of the severed material passes below the motor housing and frame of the tool.

In summary, numerous benefits have been described which result from employing any or all of the concepts and the features of the various specific aspects of the power rotary shear described herein, or those that are within the scope thereof. The throatless power rotary shear described herein acts perfectly to provide smooth cuts, without injuring the operator.

The foregoing description has been presented for purposes of illustration and description. It is not intended to be to be exhaustive or limited to the precise form disclosed. Obvious modifications or variations are possible in light of the above teachings with regards to the specific aspects. The aspect was chosen and described in order to best illustrate the principles of the power rotary shear and its practical applications to thereby enable one of ordinary skill in the art to best utilize the power rotary shear in various aspects and with various modifications as are suited to the particular use contemplated. It is intended that the scope hereof be defined by the claims which are appended hereto.

What is claimed is:

1. A rotary shear device comprising:

an s-shaped frame;

a feed wheel;

a cut wheel being adjacent to and offset from the feed wheel such that an overlap is defined therebetween; and a v-shaped relief formed in the s-shaped frame, the v-shaped relief being aligned with the overlap in a plane substantially perpendicular to a first plane defined by a cut wheel inner face and/or a second plane defined by a feed wheel inner face, whereby the v-shaped relief is configured to urge portions of material cut by the wheels of the rotary shear device in different directions.

2. The rotary shear device of claim 1, wherein the s-shaped frame includes a first stanchion, a second stanchion, and a connecting portion between the first stanchion and the second stanchion, and wherein the v-shaped relief is formed in the connecting portion.

3. The rotary shear device of claim 1, wherein the v-shaped relief includes a first ramp and a second ramp, and wherein the first ramp and the second ramp are angled relative to each other.

4. The rotary shear device of claim 3, wherein the first ramp and the second ramp are angled at the same angle relative to a reference plane passing therebetween.

5. The rotary shear device of claim 1, the v-shaped relief being located behind the feed wheel and the cut wheel relative to a direction of cutting.

6. The rotary shear device of claim 1, wherein the feed wheel is operatively connected to the s-shaped frame.

7. The rotary shear device of claim 1, wherein the cut wheel is operatively connected to the s-shaped frame.

8. The rotary shear device of claim 1, further including a motor operatively connected to drive the feed wheel.

9. The rotary shear device of claim 8, wherein the motor is located behind and spaced from the cut wheel relative to a direction of cutting.

10. The rotary shear device of claim 9, wherein a rotational axis of the motor is oriented at an angle relative to the direction of cutting.

11. The rotary shear device of claim 9, further including a handle, and wherein the handle is located behind and spaced from the cut wheel relative to a direction of cutting.

12. The rotary shear device of claim 11, wherein the handle is mounted on the motor.

13. A rotary shear device having a cutting direction, comprising:

an s-shaped frame;

a feed wheel;

a cut wheel being adjacent to and offset from the feed wheel such that an overlap is defined therebetween; and a v-shaped relief formed in the s-shaped frame, the v-shaped relief being aligned with the overlap in a plane substantially parallel to the cutting direction, whereby the v-shaped relief is configured to urge portions of material cut by the wheels of the rotary shear device in different directions.

14. The rotary shear device of claim 13, further including a motor operatively connected to drive the feed wheel, wherein the motor is located behind and spaced from the cut wheel relative to a cutting direction, and wherein a rotational axis of the motor is oriented at an angle relative to the cutting direction.

15. A rotary shear device comprising:

an s-shaped frame;

a feed wheel having a first axis of rotation;

a cut wheel being adjacent to and offset from the feed wheel such that an overlap is defined therebetween, the cut wheel having a second axis of rotation; and a v-shaped relief formed in the s-shaped frame, the v-shaped relief being aligned with the overlap in a plane substantially parallel to the first and/or second axis of rotation, whereby the v-shaped relief is configured to urge portions of material cut by the wheels of the rotary shear device in different directions.

16. The rotary shear device of claim 15, further including a motor operatively connected to drive the feed wheel, and wherein the motor is located behind and spaced from the cut wheel relative to a cutting direction, and wherein a rotational axis of the motor is oriented at an angle relative to the cutting direction.

* * * * *